United States Patent [19]

Bräuer et al.

[11] Patent Number: 5,200,491
[45] Date of Patent: Apr. 6, 1993

[54] PROCESS FOR THE PREPARATION OF THERMOPLASTIC POLYURETHANE ELASTOMERS

[75] Inventors: Wolfgang Bräuer, Leverkusen; Friedemann Müller, Neuss; Karl-Heinz Ott, Leverkusen, all of Fed. Rep. of Germany

[73] Assignee: Bayer Aktiengesellschaft, Leverkusen, Fed. Rep. of Germany

[21] Appl. No.: 903,416

[22] Filed: Jun. 24, 1992

[30] Foreign Application Priority Data

Jul. 2, 1991 [DE] Fed. Rep. of Germany ....... 4121785

[51] Int. Cl.$^5$ ............................................. C08G 18/08
[52] U.S. Cl. ..................................... 528/51; 528/905; 528/906
[58] Field of Search ........................ 528/51, 905, 906

[56] References Cited

U.S. PATENT DOCUMENTS

| | | | |
|---|---|---|---|
| 3,159,591 | 12/1964 | Lanham | 528/51 |
| 3,794,592 | 2/1974 | Winters et al. | 252/182 |
| 4,169,196 | 9/1979 | Ehrlich et al. | 528/58 |
| 4,361,692 | 11/1982 | Ammons | 528/51 |
| 5,064,885 | 11/1991 | Müller et al. | 524/117 |

FOREIGN PATENT DOCUMENTS

| | | |
|---|---|---|
| 195136 | 3/1907 | Fed. Rep. of Germany . |
| 148883 | 6/1981 | Fed. Rep. of Germany . |
| 155620 | 6/1982 | Fed. Rep. of Germany . |
| 974308 | 11/1964 | United Kingdom . |

OTHER PUBLICATIONS

Kunststoffe, 68, (1978), pp. 819 to 825—English translation also attached.

*Primary Examiner*—Maurice J. Welsh
*Attorney, Agent, or Firm*—Joseph C. Gil; Richard E. L. Henderson

[57] ABSTRACT

This invention relates to a process for standardized preparation of thermoplastic polyurethane elastomers by deactivating metal traces during the reaction, at an NCO:OH ratio of between about 0.85 and about 1.2:1, of (a) substantially linear hydroxyl-terminated polyols;
(b) organic diisocyanates;
(c) optional diol chain extenders; and
(d) optional catalysts or other auxiliaries and/or additives, in the presence of
(e) 0.000001 to 0.3% by weight, based on the total weight of the other components, of certain phosphorus compounds, wherein the phosphorus compounds are added to one or more of the other components before or during preparation of the thermoplastic polyurethane elastomers.

9 Claims, No Drawings

PROCESS FOR THE PREPARATION OF THERMOPLASTIC POLYURETHANE ELASTOMERS

BACKGROUND OF THE INVENTION

This invention relates to a process for the standardized preparation of thermoplastic polyurethane elastomers by the deactivation of reactive metal traces by phosphorus compounds.

Thermoplastic polyurethane elastomers ("TPU's") have long been known. TPU's have industrial significance by virtue of the combination of good mechanical properties with the known advantages of inexpensive thermoplastic processability. A wide range of variation of mechanical properties can be obtained by using different chemical synthesis components. A review of TPU's and their properties and applications can be found, for example, in *Kunststoffe*, 68 (1978), pages 819 to 825, or Kautschuk, Gummi, *Kunststoffe*, 35 (1982), pages 568 to 584.

TPU's are prepared from linear polyhydroxy compounds (generally polyesters or polyethers), organic diisocyanates, and short-chain diols. They may be prepared continuously or discontinuously. The best known production processes, which are also used on an industrial scale, are the so-called belt process and the extruder process.

In practice, however, the preparation of TPU's is complicated by a variable content of metal traces in the raw materials, especially in the linear polyhydroxy compounds. These metal traces either come from the production plant or are added as catalyst in the preparation of the polyhydroxy compounds. For example, the metals may be present as organic or inorganic iron, copper, titanium, tin, antimony, or lead compounds. They are often subjected to decomposition kinetics which lead to a variable content in the raw materials. These metal traces in the ppm range can cause unwanted secondary reactions and/or, because of their effect on TPU reactions, uncontrolled temperature increases during the production of TPU's that lead to variations in the properties of the end products.

For these reasons, it is advantageous to deactivate the metal traces before or during preparation of the TPU's, so that the resultant constant, relatively low reactivity of the raw materials allows controlled linear synthesis of the TPU's.

Certain compounds are already known as deactivators for metal traces in the raw materials used for polyurethane reactions. Such compounds are primarily complexing agents, such as β-diketones (DD 155,620) and N-heterocycles (DD 195,136); acids, such as phosphoric acid (U.S. Pat. No. 3,794,592); and oxidizing agents, such as $H_2O_2$ (DD 148,883).

The disadvantages of these compounds, which are used primarily in crosslinked polyurethane systems, reside on the one hand in their limited effectiveness in the special TPU raw materials and on the other hand in the effects which they have on the properties of the thermoplastically processable polyurethane final product (e.g., discoloration through oxidation and/or hydrolysis).

Accordingly, there remains a need to deactivate the metal traces in the raw materials in a simple and effective manner which does not effect the properties of the TPU's.

SUMMARY OF THE INVENTION

Accordingly, the present invention relates to a process for the standardized preparation of thermoplastic polyurethane elastomers (TPU's) comprising reacting at an NCO:OH ratio of between about 0.85 and about 1.2:1

(a) at least one substantially linear hydroxyl-terminated polyol;
(b) at least one diisocyanate corresponding to the formula OCN-Z-NCO, wherein Z is a difunctional organic group;
(c) optionally, at least one diol chain extender (preferably an aliphatic $C_{2-14}$ diol); and
(d) optionally, catalysts or other auxiliaries and/or additives, in the presence of
(e) about 0.000001 to about 0.3% by weight, preferably 0.00001 to about 0.2, especially preferred 0.0001 to about 0.1% by weight, based on the total weight of the other components, of one or more phosphorus compounds corresponding to general formulas (I) to (IV) below, wherein said phosphorus compound is added to one or more of the other components (preferably component (a)) before or during preparation of the TPU to deactivate metal traces.

DETAILED DESCRIPTION OF THE INVENTION

Suitable phosphorus compounds according to the invention include phosphites corresponding to general formula I

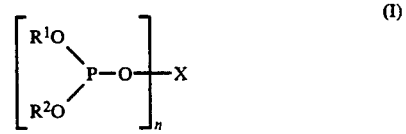

in which
X is hydrogen or an optionally substituted n-covalent $C_{1-18}$ aliphatic, $C_{5-18}$ cycloaliphatic, $C_{6-18}$ aromatic, $C_{7-24}$ alkaryl, or $C_{7-24}$ aralkyl group optionally containing olefinic double bonds and/or heteroatoms (preferably O, S, and non-basic N);

n is an integer of 1 to 4 (preferably 1 to 2) according to the covalence n of X; and $R^1$ and $R^2$ are independently $C_{1-18}$ alkyl, $C_{5-15}$ cycloalkyl, $C_{7-24}$ aralkyl or alkaryl, or $C_{6-24}$ aryl, or $R^2$ represents $C_{1-18}$ alkyl, $C_{5-15}$ cycloalkyl, $C_{7-24}$ aralkyl or alkaryl, or $C_{6-24}$ aryl, and $R^1$ and X together represent an optionally substituted $C_{2-4}$ alkylene chain, or $R^1$, $R^2$, and X together represent a linear or branched $C_{1-9}$ alkyl or $C_{5-7}$ cycloalkyl group optionally substituted by 3- to 6-membered rings containing O and S as heteroatoms.

Suitable phosphites such as these are described in European Patent Application 23,291.

Preferred stabilizers are phosphites corresponding to formula I in which X is hydrogen or an aromatic group (preferably substituted by $C_{1-9}$ alkyl groups), and $R^1$ and $R^2$ are aromatic groups (preferably substituted by $C_{1-9}$ alkyl groups in the o- and/or p-position relative to the phosphite ester bond).

Particularly preferred stabilizers are compounds corresponding to formula I in which n is 1 and $R_1$, $R_2$, and X are each an aromatic group substituted by $C_9$ alkyl, Most preferred stabilizers of this type are compounds of formula I in which n is 1, $R_1$ and $R_2$ are each an aromatic group, and X is hydrogen.

Other suitable stabilizers are phosphites corresponding to general formula II

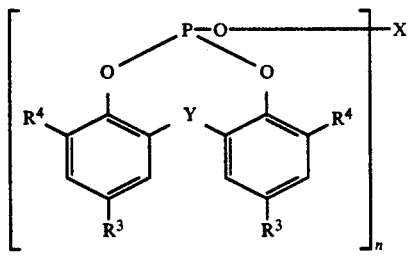

in which

X and n are as defined above;

$R^3$ and $R^4$ are the same or different and independently represent $C_{1-9}$ aliphatic, $C_{5-6}$ cycloaliphatic, $C_{7-9}$ aralkyl, or $C_{6-10}$ aryl groups; and Y is a direct single bond, S, or $HCR^5$ wherein $R^5$ is hydrogen, $C_{1-6}$ alkyl, cyclohexyl.

Particularly preferred stabilizers are compounds corresponding to formula II in which X is hydrogen, $R^3$ is a $C_{1-9}$ alkyl group, a $C_{5-6}$ cycloalkyl group, a $C_{7-9}$ aralkyl group, or a $C_{6-10}$ aryl group, $R^4$ is a benzyl, α methylbenzyl, α,α'-dimethylbenzyl, methyl, ethyl, isopropyl, tert-butyl, tert-amyl, isononyl, cyclopentyl, or cyclohexyl group, and Y represents S, $CH_2$, $CH_3$—CH, $CH_3CH_2$—CH, $CH_3CH_2CH_2$—CH or $(CH_3)_2CH$—CH,

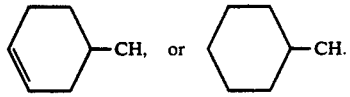

These phosphites of formula II are described in European Patent Application 232,901.

Other stabilizers suitable for use in accordance with the invention are compounds of formulas III to IIIe according to German Offenlegungsschrift 2,034,887:

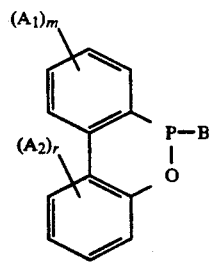

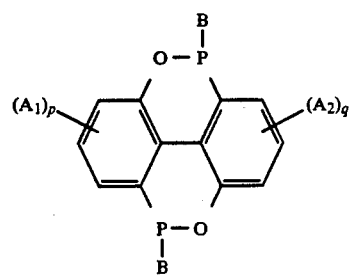

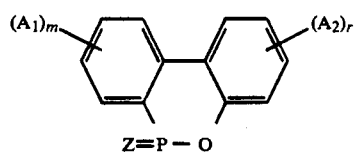

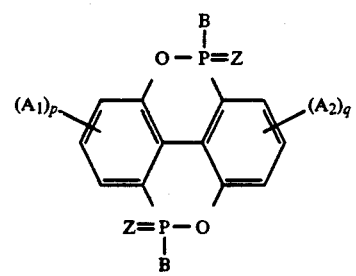

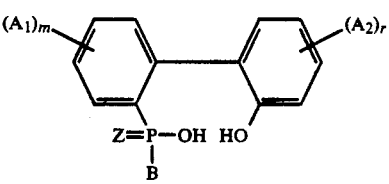

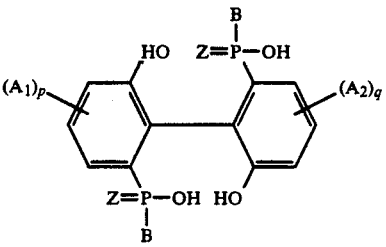

in which

B is hydrogen, hydroxyl, halogen, $C_{1-22}$ alkyl, $C_{1-22}$ alkoxy, $C_{1-22}$ alkylthio, aryloxy, or arylthio, $A_1$ and $A_2$ are the same or different and independently represent hydrogen, halogen, $C_{1-18}$ alkyl, $C_{1-18}$ alkyloxy, aryl, aryloxy, acyl, or cyano, or $A_1$ and $A_2$ together are —CH=CH— and together with the biphenyl ring form a phenanthrene ring;

Z is oxygen or sulfur;

m and r are integers of 0 to 4; and p and q are integers of 0 to 3.

The systematic names of these organophosphorus compounds are very complicated. For example, they have the following structural formulas:

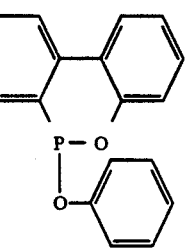

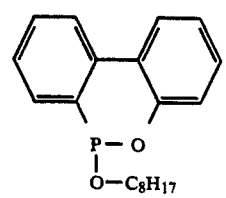

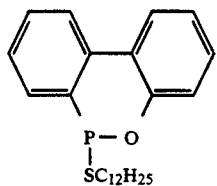
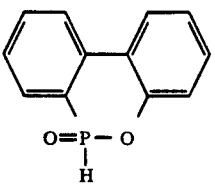
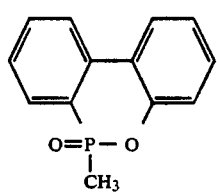
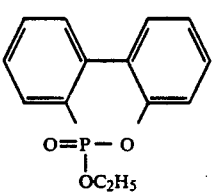
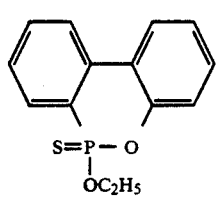
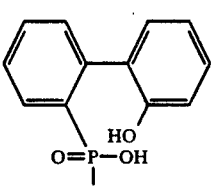
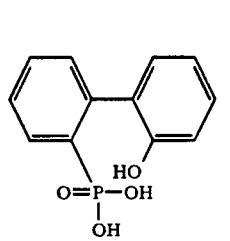
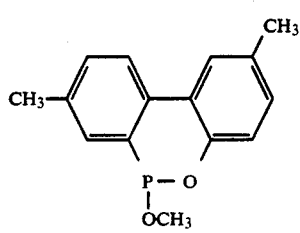
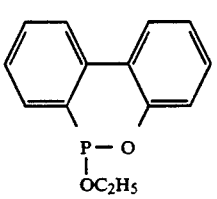
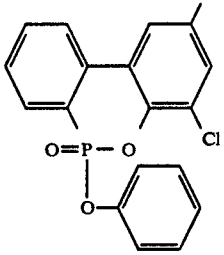
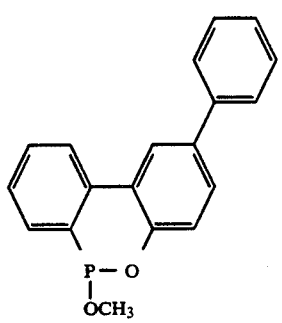
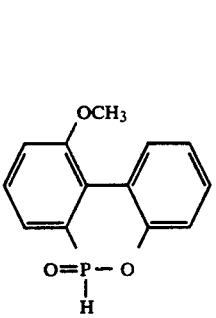
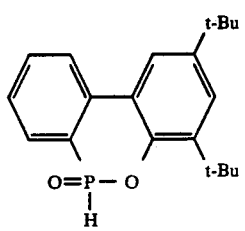
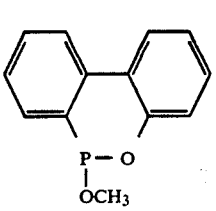

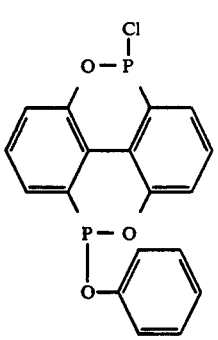
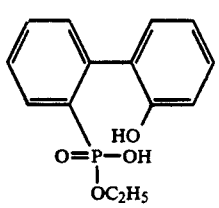
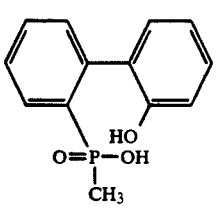

Preferred compounds of the biphenyl (or phenanthrene) type are those in which

B is hydrogen, hydroxyl, $C_{1-18}$ alkyl, $C_{1-18}$ alkoxy, aryloxy, or arylthio;

$A_1$ and $A_2$ are hydrogen, $C_{1-9}$ alkyl, $C_{1-9}$ alkoxy, aryl, or aryloxy;

Z is O;

m and r are 0, 1, or 2; and p and q are 0, 1, or 2.

Particularly preferred compounds are those in which B is hydrogen or hydroxyl, $A_1$ and $A_2$ are both hydrogen, Z is O, m and r are 0 or 1, and p and q are 0.

Other stabilizers which may be used in accordance with the invention are phosphites corresponding to formula IV which may be obtained from pentaerythritol, perhydrobisphenol A, monoalcohols, and phosphorous acid esters. These compounds are prepared by transesterification of the components trialkyl or triphenyl phosphite, pentaerythritol, perhydrobisphenol, and, optionally, a monoalcohol in the necessary molar ratios, the alcohol from the trialkyl or phenol from the triphenyl phosphite being removed from the equilibrium by distillation (optionally in vacuo) up to a maximum sump temperature of 200° C.

Pentaerythritol is preferably first reacted with the phosphite with removal by distillation of a first fraction of approximately 2 mol of hydroxy compound per mol of phosphite, followed by addition of perhydrobisphenol A, after which more hydroxy compound is distilled off during the reaction at a sump temperature of preferably 180° C. (more preferably 170° C.).

If a $C_{6-18}$ monoalcohol is also to be used, it is preferably added after the second fraction of the hydroxy compound has been distilled off. After addition of this monoalcohol, a third fraction of the hydroxy compound is removed from the phosphite originally used by distillation (optionally in vacuo) up to a sump temperature of preferably 180° C. (more preferably 170° C.).

A vacuum must be applied, particularly when triphenyl phosphite is used or when, in the final stages of the transesterification, the final traces of a lower alcohol are to be removed from the reaction mixture.

The components mentioned are reacted with one another in the following molar ratios:

| Components | Generally | Better | Preferred | Particularly preferred |
|---|---|---|---|---|
| Perhydro-bisphenol A | 1 | 1 | 1 | 1 |
| Pentaerythritol | 0.5–2.0 | 0.66–1.5 | 0.75–1.3 | 0.80–1.2 |
| Phosphite | 1.3–4.0 | 1.5–3.5 | 1.6–3.2 | 1.7–2.8 |
| Monoalcohol | 0–1.5 | 0–1.0 | 0–0.5 | 0–0.3 |

Suitable phosphites include triphenyl phosphite and, preferably, trialkyl phosphites from $C_{1-4}$ alcohols (more preferably trimethyl and triethyl phosphite).

Suitable monoalcohols include aliphatic alcohols containing 6 to 18 carbon atoms, particularly primary alcohols. Examples of suitable monoalcohols are isooctanol, decanol, dodecanol, tetradecanol, and octadecanol.

This synthesis by transesterification does not, of course, give individual compounds but rather mixtures of oligomeric phosphites predominantly having structure IV below:

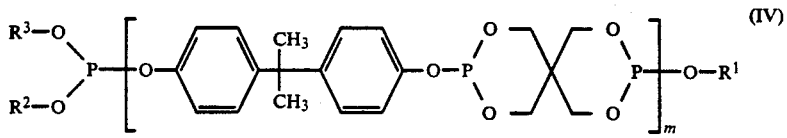
(IV)

in which $R^1$, $R^2$, and $R^3$ are the same or different and independently represent $C_{1-18}$ alkyl, aryl, or a group of structure V

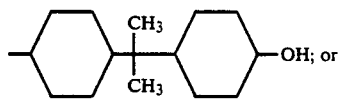
(V)

$R^2$ and $R^3$ are as defined above and $R^1$ is a group of structure VI

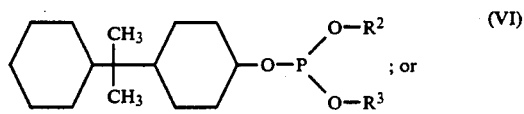
(VI)

$R^1$ is as defined above and $R^2$ and $R^3$ are a group of structure VII

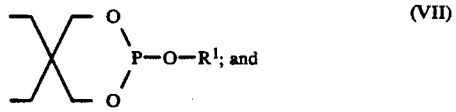
(VII)

m is an integer of 1 to 20.

Preferably, $R^1$, $R^2$, and $R^3$ are methyl, ethyl, propyl, butyl, isooctyl, decyl, dodecyl, tetradecyl, or octadecyl, in addition to which $R^1$ may be a group of structure V or VI and $R^2$ and $R^3$ together represent the group VII, and m is 2 to 15. More preferably, $R^1$, $R^2$, and $R^3$ are methyl, ethyl, or octadecyl (stearyl), in addition to which $R^1$ is the group of structure V or VI and $R^2$ and $R^3$ together may represent the group of structure VII, and m is 2 to 10.

Stabilizers similar to those corresponding to structure IV are disclosed in U.S. Pat. No. 3,571,251.

These phosphites may also be used in accordance with the invention. However, particularly preferred phosphites correspond to general formula II.

According to the invention, the phosphorus compounds mentioned are added to the raw materials and preparation of the TPU's is carried out in known manner, with the starting materials standardized to lower reactivity by reacting (a) at least one substantially linear hydroxyl-terminated polyol (preferably a polyester, polyether, polycarbonate or a mixture thereof), preferably having an average molecular weight of 800 to 5,000 (more preferably, 1,000 to 4,000);

(b) at least one diisocyanate corresponding to the general formula OCN-Z-NCO, in which Z is a difunctional organic radical;

(c) optionally, at least one diol chain extender (preferably an aliphatic diol containing 2 to 14 carbon atoms, and more preferably ethylene glycol, butanediol, hexanediol, or 1,4-di(β-hydroxyethyl)hydroquinone), the NCO:OH ratio of the basic components used being between 0.85 and 1.2:1 (preferably between 0.95 and 1.1:1).

Suitable polyetherols (a) can be prepared by reacting one or more alkylene oxides containing 2 to 4 carbon atoms in the alkylene group with a starter molecule containing two bound active oxygen atoms. Suitable alkylene oxides include, for example, ethylene oxide, 1,2-propylene oxide, epichlorohydrin, and 1,2- and 2,3-butylene oxide. Ethylene oxide, propylene oxide, and mixtures of 1,2-propylene oxide and ethylene oxide are preferably used. The alkylene oxides may be used individually, alternately one after the other, or in the form of mixtures. Suitable starter molecules include, for example, water; aminoalcohols, such as N-alkyl diethanolamines (for example N-methyl diethanolamine); and diols, such as ethylene glycol, 1,3-propylene glycol, butane-1,4-diol, and hexane-1,6-diol. Mixtures of starter molecules may also be used. Other suitable polyetherols are the hydroxyl-functional polymerization products of tetrahydrofuran.

The substantially linear polyetherols preferably have molecular weights of 800 to 5,000 (more preferably, in the range from 1,000 to 4,000). They may be used both individually and in the form of mixtures with one another.

Suitable polyesterols (a) may be prepared, for example, from dicarboxylic acids containing 2 to 12 carbon atoms (preferably 4 to 6 carbon atoms) and polyhydric alcohols. Suitable dicarboxylic acids include, for example, aliphatic dicarboxylic acids, such as succinic acid, glutaric acid, adipic acid, suberic acid, azelaic acid, and sebacic acid, and aromatic dicarboxylic acids, such as phthalic acid, isophthalic acid, and terephthalic acid. The dicarboxylic acids may be used individually or in the form of mixtures, for example, in the form of a mixture of succinic, glutaric, and adipic acid. Instead of using the dicarboxylic acids for the preparation of the polyesterols, it may be advantageous to use the corresponding dicarboxylic acid derivatives, such as carboxylic acid diesters containing 1 to 4 carbon atoms in the alcohol group, carboxylic anhydrides, or carboxylic acid chlorides. Examples of polyhydric alcohols are glycols containing 2 to 10 (preferably 2 to 6 carbon atoms), such as ethylene glycol, diethylene glycol, butane-1,4-diol, pentane-1,5-diol, hexane-1,6-diol, and decane-1,10-diol, 2,2-dimethylpropane-1,3-diol, propane-1,3-diol, and dipropylene glycol. The polyhydric alcohols may be used individually or in admixture with one another, depending on the desired properties.

Also suitable are esters of carbonic acid with the diols mentioned above, particularly those containing 4 to 6 carbon atoms, such as butane-1,4-diol and/or hexane-1,6-diol; condensation products of ω-hydroxycarboxylic acids, such as ω-hydroxycaproic acid; and, preferably, polymerization products of lactones, such as optionally substituted ω-caprolactones.

Preferred polyesterols are ethanediol polyadipates, butane-1,4-diol polyadipates, ethanediol/butane-1,4-diol polyadipates, hexane-1,6-diol/neopentyl glycol polyadipates, hexane-1,6-diol/butane-1,4-diol polyadipates, and polycaprolactones.

The polyesterols have molecular weights of 800 to 5,000 (preferably 1,000 to 4,000).

Suitable organic diisocyanates (b) include, for example, aliphatic, cycloaliphatic, and, preferably, aromatic diisocyanates. Examples of such diisocyanates are aliphatic diisocyanates, such as hexamethylene diisocyanate; cycloaliphatic diisocyanates, such as isophorone diisocyanate, 1,4-cyclohexane diisocyanate, 1-methyl-2,4- and -2,6-cyclohexane diisocyanate and the corresponding isomer mixtures, and 4,4'-, 2,4', and 2,2'-dicyclohexylmethane diisocyanate and the corresponding isomer mixtures; and, preferably, aromatic diisocyanates, such as 2,4-toluene diisocyanate, mixtures of 2,4- and 2,6-toluene diisocyanate, 4,4'-, 2,4'- and 2,2'-diphenylmethane diisocyanate, mixtures of 2,4'- and 4,4'-diphenylmethane diisocyanate, urethane-modified liquid 4,4'-and/or 2,4'-diphenylmethane diisocyanates, 4,4'-diisocyanato-1,2-diphenylethane and 1,5-naphthylene diisocyanate. It is preferred to use 1,6-hexamethylene diisocyanate, isophorone diisocyanate, diphenylmethane diisocyanate isomer mixtures having a 4,4'-diphenylmethane diisocyanate content of greater than 96% by weight, and, more particularly, 4,4'-diphenylmethane diisocyanate and 1,5-naphthylene diisocyanate.

Preferred chain-extending agents (c) having molecular weights of 60 to 300 include aliphatic diols containing 2 to 14 carbon atoms, such as ethanediol, hexane-1,6-diol, diethylene glycol, dipropylene glycol, and, more particularly, butane-1,4-diol. However, other suitable chain-extending agents (c) are diesters of terephthalic acid with glycols containing 2 to 4 carbon atoms, such as terephthalic acid bis-ethylene glycol or butane-1,4-diol esters; hydroxyalkylene ethers of hydroquinone, such as 1,4-di(β-hydroxyethyl)hydroquinone; (cyclo)aliphatic diamines, such as isophorone diamine, ethylenediamine, 1,2- and 1,3-propylenediamine, N-methyl propylene-1,3-diamine, N,N'-dimethyl ethylenediamine; and aromatic diamines, such as 2,4- and 2,6-toluenediamine, 3,5-diethyl-2,4- and/or -2,6-toluenediamine, and primary ortho-di-, tri-, and/or tetraalkyl-substituted 4,4'-diaminodiphenylmethanes.

In order to adjust the rigidity and melting point of the TPU's, synthesis components (a), (b) and (c) may be varied over relatively wide molar ratios. Molar ratios of polyhydroxyl compounds (a) to chain-extending agents (c) of about 1:1 to about 1:12 have proved to be effective, the rigidity and melting point of the TPU's increasing with increasing diol content. Products having a hardness in the range from about 70 Shore A to about 75 Shore D can be obtained in this way.

To prepare TPU's according to the invention, synthesis components (a), (b), and (c) may be reacted, optionally in the presence of catalysts or other auxiliaries and/or additives (d), in such quantities that the equivalence ratio of NCO groups of the diisocyanates to the sum of the NCO-reactive groups (particularly the OH groups of components (a) and (c)) is from about 1:0.85 to about 1:1.120 (preferably from 1:0.95 to 1:1.10).

Suitable catalysts that, in particular, accelerate the reaction between the NCO groups of the diisocyanates (b) and the hydroxyl groups of components (a) and (c) include tertiary amines known from and normally used in polyurethane chemistry, such as triethyl amine, dimethyl cyclohexyl amine, N-methylmorpholine, N,N'-dimethylpiperazine, 2-(dimethylaminoethoxy)ethanol, diazabicyclo[2.2.2]octane, and the like, and, more particularly, organometallic compounds, such as titanic acid esters, iron compounds, and tin compounds such as tin diacetate, tin dioctoate, tin dilaurate, or the dialkyl tin salts of aliphatic carboxylic acids (such as dibutyltin diacetate or dibutyltin dilaurate) or the like. The catalysts are normally used in quantities of about 0.0005 to about 0.1 part per 100 parts of polyhydroxy compound.

In addition to catalysts, other auxiliaries and/or additives (d) may also be incorporated in the synthesis components. Examples of suitable auxiliaries and additives include lubricants, inhibitors, stabilizers against hydrolysis, light, heat, and discoloration, flameproofing agents, dyes, pigments, inorganic and/or organic fillers, and reinforcing materials.

More information on the auxiliaries and additives mentioned above can be found in the scientific literature, for example, in J. H. Saunders and K. C. Frisch, *High Polymers*, Vol. XVI, "Polyurethane", Parts 1 and 2, Interscience Publishers, 1962 and 1964, or German Offenlegungsschrift 2,901,774.

The phosphorus compounds used in accordance with the invention are added directly after preparation of the hydroxyl-terminated polyols and/or just before or during the TPU reaction. In a particularly advantageous embodiment, the phosphorus compounds are added during preparation of the hydroxyl-terminated polyol at the TPU manufacturing plant (storage tank). The phosphorus compounds may be added at temperatures of up to about 150° C.

The phosphorus compounds used according to the invention complex the TPU-active residual catalysts from polyol production. The polyol batches supplied with different reactivities are thus brought to a uniformly low level of residual catalyst. There is therefore no need for the common intermediate storage of the polyol to achieve the low "activity" required for the TPU reaction. The TPU reaction may then be carried out under control, optionally with addition of a now defined quantity of catalyst. Any traces of metal compounds present from the production plant are also masked.

The TPU's may be prepared using known mixing units, preferably of the high-shear type. Examples of suitable mixing units for continuous preparation include co-kneaders, preferably extruders, such as twin-screw extruders and buss kneaders. The mixing head/belt process may also be used.

The process according to the invention gives thermoplastically processable polyurethanes that can be used as injection-molded articles, extrudates, and coating compounds.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts and percentages are parts by weight and percentages by weight, respectively.

EXAMPLES

Examples 1 to 5

Deactivation of the Polyol

300 Parts by weight of a polybutylene adipate (molecular weight approx. 2,200) were stirred for 4 hours and 23 hours at 90° C. with 100 ppm of the particular deactivator. After heating to 140° C., the polyester was reacted with 120 parts by weight 4,4'-diphenylmethane diisocyanate with intensive stirring in a pot (60° C.).

Samples of the reaction mixture were taken after the time intervals shown in the Tables and stopped in a dibutyl amine solution. Back-titration with HCl gave the residual unreacted NCO content from which the conversion was calculated.

The conversions of some possible deactivators, including the Examples according to the invention, are shown in the Tables by comparison with corresponding deactivator-free tests.

Example 1

Deactivator Triphenyl Phosphite

| Time (sec) | Conversion (%) Without deactivator | With deactivator After 4 hr | After 23 hr |
|---|---|---|---|
| 10 | 37 | 45 | 59 |
| 20 | 71 | 65 | 58 |
| 30 | 77 | 76 | 80 |
| 60 | 93 | 94 | 90 |

Example 2

Deactivator Acetyl Acetone

| Time (sec) | Conversion (%) Without deactivator | With deactivator After 4 hr | After 23 hr |
|---|---|---|---|
| 10 | 65 | — | 55 |
| 20 | 70 | — | 55 |
| 30 | 79 | — | 76 |
| 60 | 91 | — | 95 |

Example 3

Deactivator H$_2$O$_2$

| Time (sec) | Conversion (%) Without deactivator | With deactivator After 4 hr | After 23 hr |
|---|---|---|---|
| 10 | 72 | 59 | 57 |
| 20 | 85 | 63 | 62 |
| 30 | 86 | 73 | 72 |
| 60 | 89 | 82 | 85 |

Example 4

(According to the Invention)

Deactivator semiester of phosphorous acid corresponding to the following formula was used:

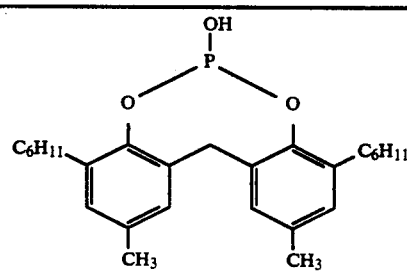

| Time (sec) | Conversion (%) Without deactivator | With deactivator After 4 hr | After 23 hr |
|---|---|---|---|
| 10 | 49 | 30 | 39 |
| 20 | 75 | 45 | 46 |
| 30 | 80 | 49 | 55 |
| 60 | 94 | 73 | 68 |

Example 5

(According to the Invention)

Deactivator semiester of phosphorous acid corresponding to the following formula was used:

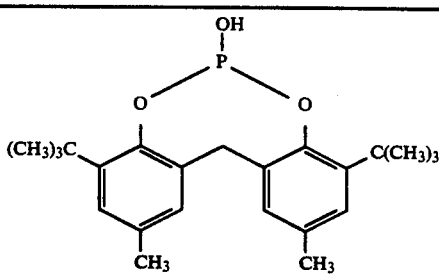

| Time (sec) | Conversion (%) Without deactivator | With deactivator After 4 hr | After 23 hr |
|---|---|---|---|
| 10 | 37 | 38 | 35 |
| 20 | 72 | 62 | 50 |
| 30 | 73 | 67 | 46 |
| 60 | 95 | 80 | 70 |

Example 6

Preparation of a Thermoplastically Processable Polyurethane

100 Parts by weight of a polybutylene adipate (molecular weight approx. 2,200) deactivated with 100 ppm of the semiester of phosphorous acid (Example 4, 16 hours) were introduced into a one liter reactor at 140°

C. 40 Parts by weight 4,4'-diisocyanatodiphenylmethane ("MDI") at 60° C. were then added with stirring. After 1 minutes, 10 parts by weight of butane-1,4-diol heated to 60° C. were added. After another 30 seconds, the reaction mixture was poured onto a coated metal plate and heated for 30 minutes at 120° C.

What is claimed is:

1. A process for the preparation of thermoplastic polyurethane elastomers comprising reacting at an NCO:OH ratio of between 0.85 and 1.2:1

(a) at least one substantially linear hydroxyl-terminated polyol;
   (b) at least one diisocyanate corresponding to the formula OCN-Z-NCO, wherein Z is a difunctional organic group;
   (c) optionally, at least one diol chain extender; and
   (d) optionally, catalysts or other auxiliaries and/or additives, in the presence of (e) 0.000001 to 0.3% by weight, based on the total weight of the other components, of one or more phosphorus compounds that is added to one or more of the other components before or during preparation of the thermoplastic polyurethane elastomer to deactivate metal traces, wherein said phosphorus compound is selected from the group consisting of (i) a phosphite corresponding to the formula

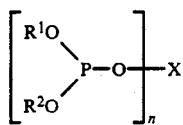

in which

X is hydrogen or an optionally substituted n-covalent $C_{1-18}$ aliphatic, $C_{4-18}$ cycloaliphatic, $C_{6-18}$ aromatic, $C_{7-24}$ alkaryl, or $C_{7-24}$ aralkyl group optionally containing olefinic double bonds and/or heteroatoms selected from O, S, and non-basic N;

n is an integer of 1 to 4 according to the covalence n of X; and $R^1$ and $R^2$ are independently $C_{1-18}$ alkyl, $C_{5-15}$ cycloalkyl, $C_{7-24}$ aralkyl or alkaryl, or $C_{6-24}$ aryl, or $R^2$ represents $C_{1-18}$ alkyl, $C_{5-15}$ cycloalkyl, $C_{7-24}$ aralkyl or alkaryl, or $C_{6-24}$ aryl, and $R^1$ and X together represent an optionally substituted $C_{2-4}$ alkylene chain, or $R^1$, $R^2$, and X together represent a linear or branched $C_{1-9}$ alkyl or $C_{5-7}$ cycloalkyl group optionally substituted by 3- to 6-membered rings containing O and S as heteroatoms;

(ii) a phosphite corresponding to the formula

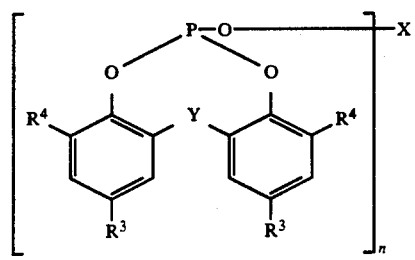

in which

X and n are as defined above;

$R^3$ and $R^4$ are the same or different and independently represent $C_{1-9}$ aliphatic, $C_{5-6}$ cycloaliphatic, $C_{7-9}$ aralkyl, or $C_{6-10}$ aryl groups; and Y is a direct single bond, S, or $HCR^5$ wherein $R^5$ is hydrogen, $C_{1-6}$ alkyl, cyclohexenyl, or cyclohexyl;

(iii) a compound having the formula

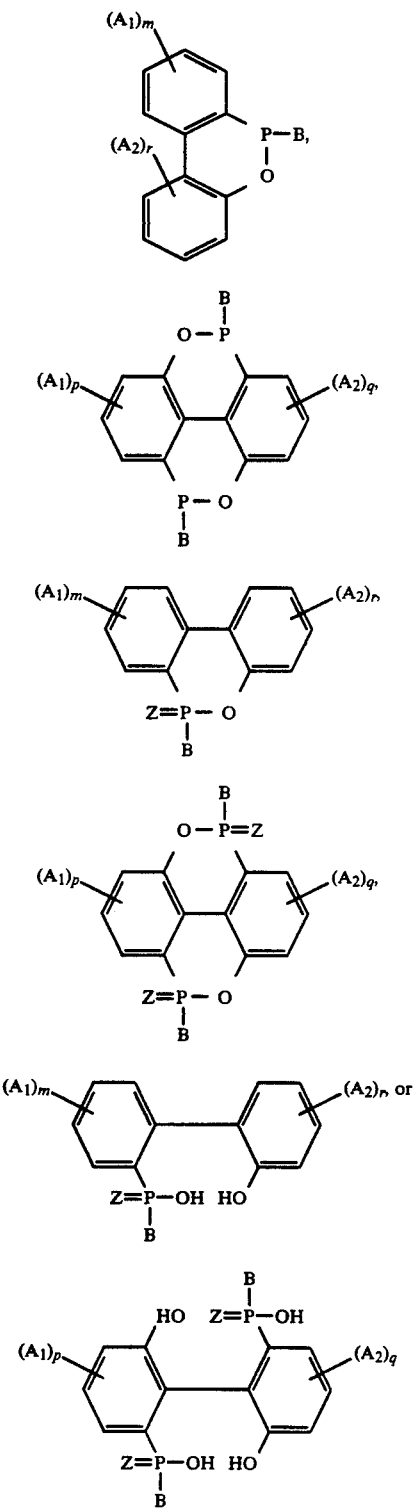

in which
B is hydrogen, hydroxyl, halogen, $C_{1-22}$ alkyl, $C_{1-22}$ alkoxy, $C_{1-22}$ alkylthio, aryloxy, or arylthio,
$A_1$ and $A_2$ are the same or different and independently represent hydrogen, halogen, $C_{1-18}$ alkyl, $C_{1-18}$ alkyloxy, aryl, aryloxy, acyl, or cyano, or $A_1$ and $A_2$ together are —CH=CH— and together with the biphenyl ring form a phenanthrene ring;
Z is oxygen or sulfur;
m and r are integers of 0 to 4; and
p and q are integers of 0 to 3; and
(iv) an oligomeric phosphite having the formula

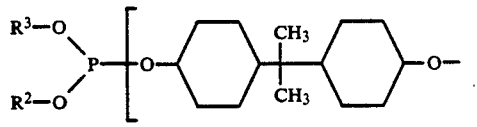

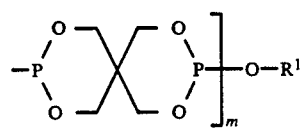

in which
$R^1$, $R^2$, and $R^3$ are the same or different and independently represent $C_{1-18}$ alkyl, aryl, or a group of the structure

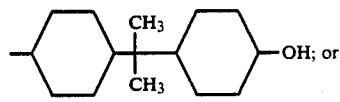

$R^2$ and $R^3$ are as defined above and $R^1$ is a group of the following structure

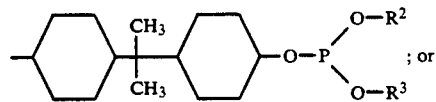

$R^1$ is as defined above and $R^2$ and $R^3$ are a group of the following structure

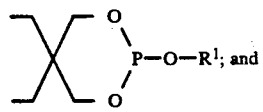

m is an integer of 1 to 20.

2. A process according to claim 1 wherein 0.00001 to 0.2% by weight, based on the total weight of the other components, of one or more phosphorus compounds (e) is added to one or more of the other components before or during preparation of the thermoplastic polyurethane elastomer.

3. A process according to claim 1 wherein the phosphorus compound (e) is a phosphite corresponding to the formula

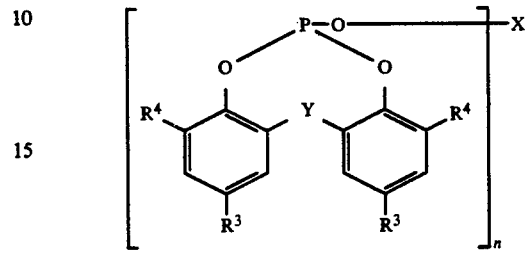

in which X, n, $R^3$, $R^4$, and Y are as defined in claim 1.

4. A process according to claim 3 wherein
X is hydrogen,
$R^3$ is a $C_{1-9}$ alkyl group, a $C_{5-6}$ cycloalkyl group, a $C_{7-9}$ aralkyl group, or a $C_{6-10}$ aryl group, $R^4$ is a benzyl, $\alpha$ methylbenzyl, $\alpha,\alpha'$-dimethylbenzyl, methyl, ethyl, isopropyl tert-butyl, tert-amyl, isononyl, cyclopentyl, or cyclohexyl group, and
Y represents S, $CH_2$, $CH_3$—CH, $CH_3CH_2$—CH, $CH_3CH_2CH_2$—CH or $(CH_3)_2CH$—CH,

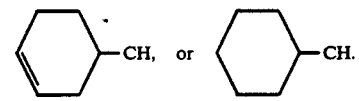

5. A process according to claim 1 wherein the hydroxyl-terminated polyol (a) is a polyester, polyether, polycarbonate, or a mixture thereof having an average molecular weight of 800 to 5,000.

6. A process according to claim 1 wherein the diol chain extender (c) is an aliphatic $C_{2-14}$ diol.

7. A process according to claim 1 wherein the diol chain extender (c) is ethylene glycol, butanediol, hexanediol, or 1,4-di($\beta$-hydroxyethyl)hydroquinone).

8. A process according to claim 1 wherein the phosphorus compound (e) is added to component (a) before or during preparation of the thermoplastic polyurethane elastomer.

9. A process according to claim 1 wherein 0.0001% to about 0.1% by weight, based on the total weight of the other components, of one or more phosphorus compounds (e) is added to one or more of the other components before or during preparation of the thermoplastic polyurethane elastomer.

* * * * *